United States Patent
Kim et al.

(10) Patent No.: US 6,400,424 B1
(45) Date of Patent: Jun. 4, 2002

(54) THIN FILM TRANSISTOR-LIQUID CRYSTAL DISPLAY HAVING ENHANCED STORAGE CAPACITANCE AND METHOD FOR MANUFACTURING THE SAME

(75) Inventors: Min Sup Kim, Kyoungki-do; Kwang Hyun Park, Seoul, both of (KR)

(73) Assignee: Hyundai Display Technology Inc., Kyoungki-do (KR)

( * ) Notice: Subject to any disclaimer, the term of this patent is extended or adjusted under 35 U.S.C. 154(b) by 0 days.

(21) Appl. No.: 09/342,614

(22) Filed: Jun. 29, 1999

(30) Foreign Application Priority Data

Jun. 30, 1998 (KR) ............................. 98-25807

(51) Int. Cl.[7] ........................ G02F 1/135; G02F 1/1343
(52) U.S. Cl. ............................ 349/38; 349/39
(58) Field of Search ............................ 349/39, 46, 43, 349/48, 38; 438/30

(56) References Cited

U.S. PATENT DOCUMENTS

| | | | |
|---|---|---|---|
| 4,759,610 A | | 7/1988 | Yanagisawa |
| 5,151,806 A | | 9/1992 | Kawamoto et al. |
| 5,459,595 A | | 10/1995 | Ishiguro et al. |
| 5,517,342 A | * | 5/1996 | Kim et al. ............... 359/59 |
| 5,834,328 A | * | 11/1998 | Jang ....................... 438/30 |
| 6,014,190 A | * | 1/2000 | Kim et al. ............... 394/39 |
| 6,022,753 A | * | 2/2000 | Park et al. ............... 438/30 |
| 6,064,358 A | * | 5/2000 | Kitajima et al. .......... 345/88 |
| 6,137,551 A | * | 10/2000 | Jeong ..................... 349/38 |

FOREIGN PATENT DOCUMENTS

| | | | |
|---|---|---|---|
| JP | 5297346 | | 11/1993 |
| JP | 6202153 | | 7/1994 |
| JP | 713190 | | 1/1995 |
| JP | 713191 | | 1/1995 |
| JP | 9258171 | | 10/1997 |
| JP | 41004866 A | * | 2/1998 |

* cited by examiner

Primary Examiner—Toan Ton
Assistant Examiner—Hoan Nguyen
(74) Attorney, Agent, or Firm—Selitto, Behr & Kim

(57) ABSTRACT

Disclosed are a thin film transistor-liquid crystal display (TFT-LCD) improving aperture ratio and having increased storage capacitance, and a manufacturing method of the same.

The TFT-LCD comprises: a glass substrate; gate bus lines arranged parallel each other on the glass substrate; data bus lines disposed perpendicular to the gate bus lines thereby defining pixel region; a thin film transistor formed adjacent to each intersection of the gate bus line and the data bus line; a transparent pixel electrode being contacted with the thin film transistor and disposed at each pixel region; a transparent storage electrode formed at a bottom of the transparent pixel electrode, wherein the transparent storage electrode forms a storage capacitance together with the pixel electrode; and a common electrode line for transmitting common signal to the storage electrode.

16 Claims, 4 Drawing Sheets

THIN FILM TRANSISTOR-LIQUID CRYSTAL DISPLAY HAVING ENHANCED STORAGE CAPACITANCE AND METHOD FOR MANUFACTURING THE SAME

FIELD OF THE INVENTION

The present invention generally relates to a liquid crystal display, more particularly to a thin film transistor-liquid crystal display("TFT-LCD") and method for manufacturing the same.

BACKGROUND OF THE INVENTION

The active matrix type LCD employing .a thin film transistor as a means for activating and having a number of pixels, has a thin and light device size and displays excellent picture quality comparable to the Cathode Ray Tube monitor.

There are two types of active matrix LCD device depending on the location of storage electrode, i.e. the storage-on-gate type and the storage-on-common type.

At first, referring to FIG. 1, general active matrix type LCD is shown.

A gate bus line 2 and a data bus line 4 are arranged in a matrix configuration thereby defining pixel region. The gate bus line 2 includes a storage electrode 3 being extruded to an outer side of its corresponding pixel. More preferably, a storage capacitance electrode 3 is disposed at a previous pixel.

A thin film transistor 10 is disposed adjacent to an intersection of the gate bus line 2 and the data bus line 4. The thin film transistor 10 includes a gate electrode 2a being extended from the gate bus line 2 to its corresponding pixel; a channel layer 5 disposed on the gate electrode 2a; a source electrode 4a being extended from the data bus line 4 and in contact with one side of the channel layer 5; and a drain electrode 4b being contacted with the other side of the channel layer 5.

A pixel electrode 7 is made of a transparent film, for example, the ITO(indium tin oxide). Further, the pixel electrode 7 is overlapped with the storage electrode 3 thereby forming a storage capacitance Cst.

In the meantime, the constitutions of active matrix LCD of general storage-on-common type will be discussed with reference to FIG. 2.

Referring to FIG. 2, a gate bus line 2 and a data bus line 4 are arranged in the matrix configuration thereby defining pixel region. A thin film transistor 10 is disposed adjacent to an intersection of the gate bus line 2 and the data bus line 4.

A storage electrode 6 is disposed parallel with the gate bus line 2 and is formed between a pair of gate bus lines 2.

A pixel electrode 7 is made of the ITO, and is formed one per pixel. The pixel electrode 7 is overlapped with the storage electrode 6 thereby forming a storage capacitance Cst. At this time, the storage electrode 6 has a larger dimension at some region thereof that is overlapped with the pixel electrode compared to the other region that is not overlapped with the pixel electrode 7 to form an adequate amount of storage capacitance.

However, those LCD devices of storage-on-gate type and storage-on-common type have following shortcomings.

First of all, in an LCD of the storage-on-gate type, as the dimension of gate bus line 2 is increased, the RC time constant in the gate bus line 2 is increased. Accordingly, signal delay of the gate bus line 2 is increased.

On the other hand, in an LCD of the storage-on-common type, as the storage electrode 6 is disposed with a selected dimension in the pixel region, the aperture ratio is decreased. Furthermore, there is formed a region intersected by the data us line. It is also involves a risk of disconnection.

SUMMARY OF THE INVENTION

Accordingly, it is one object of the present invention to provide a TFT-LCD capable of reducing the signal delay in the gate-bus-line.

It is another object of the present invention to provide a TFT-LCD capable of improving the aperture ratio.

It is further object of the present invention to provide a TFT-LCD having enhanced storage capacitance.

To accomplish the objects of the present invention, in one aspect, the present invention provides a TFT-LCD comprising: a glass substrate; gate bus lines arranged parallel each other on the glass substrate; data bus lines disposed perpendicular to the gate bus lines thereby defining pixel region; a thin film transistor formed adjacent to each intersection of the gate bus line and the data bus line; a transparent pixel electrode being contacted with the thin film transistor and disposed at each pixel region; a transparent storage electrode formed at a bottom of the transparent pixel electrode, wherein the transparent storage electrode forms a storage capacitance together with the pixel electrode; and a common electrode line for transmitting common signal to the storage electrode.

The present invention further provides a TFT-LCD comprising: a glass substrate; gate bus lines arranged parallel each other on the glass substrate; data bus lines disposed perpendicular to the gate bus lines thereby defining pixel region; a thin film transistor formed adjacent to each intersection of the gate bus line and the data bus line; a transparent pixel electrode being contacted with the thin film transistor and disposed at each pixel region; a transparent storage electrode formed at a bottom of the transparent pixel electrode, wherein the transparent storage electrode forms a storage capacitance together with the pixel electrode; and a common electrode line for transmitting common signal to the storage electrode, wherein the storage electrode has the same size and shape with the pixel electrode, wherein the common electrode line has the minimum line width preventing signal delay.

In another aspect, the present invention provides a method comprising the steps of: depositing an opaque metal film on a glass substrate; forming gate bus lines and common electrode lines by patterning a selected portion of the opaque metal film; depositing an ITO layer on the glass substrate; forming a storage electrode by patterning a selected portion of the ITO layer so as to be contacted with the common electrode line; forming a gate insulating layer on the glass substrate in which the storage electrode is formed; and forming a pixel electrode on the gate insulating layer so that the entire pixel electrode region is overlapped with the storage electrode.

The present invention further provides a method comprising the steps of: depositing an ITO layer on a glass substrate; forming a storage electrode by patterning a selected portion of the ITO layer; depositing an opaque metal film on the glass substrate in which the ITO layer is formed; forming gate bus lines and common electrode sines by patterning a selected portion of the opaque metal film, wherein the common electrode lines are contacted with the storage electrode; forming a gate insulating layer on a resultant of the glass substrate; and forming a pixel electrode on the gate insulating layer so that the entire pixel electrode region is overlapped with the storage electrode.

DETAILED DESCRIPTION OF THE PREFERRED EMBODIMENTS

Hereinafter, the preferred embodiments of the present invention will be described in detail.

First Embodiment: TFT-LCD

Figure 1:
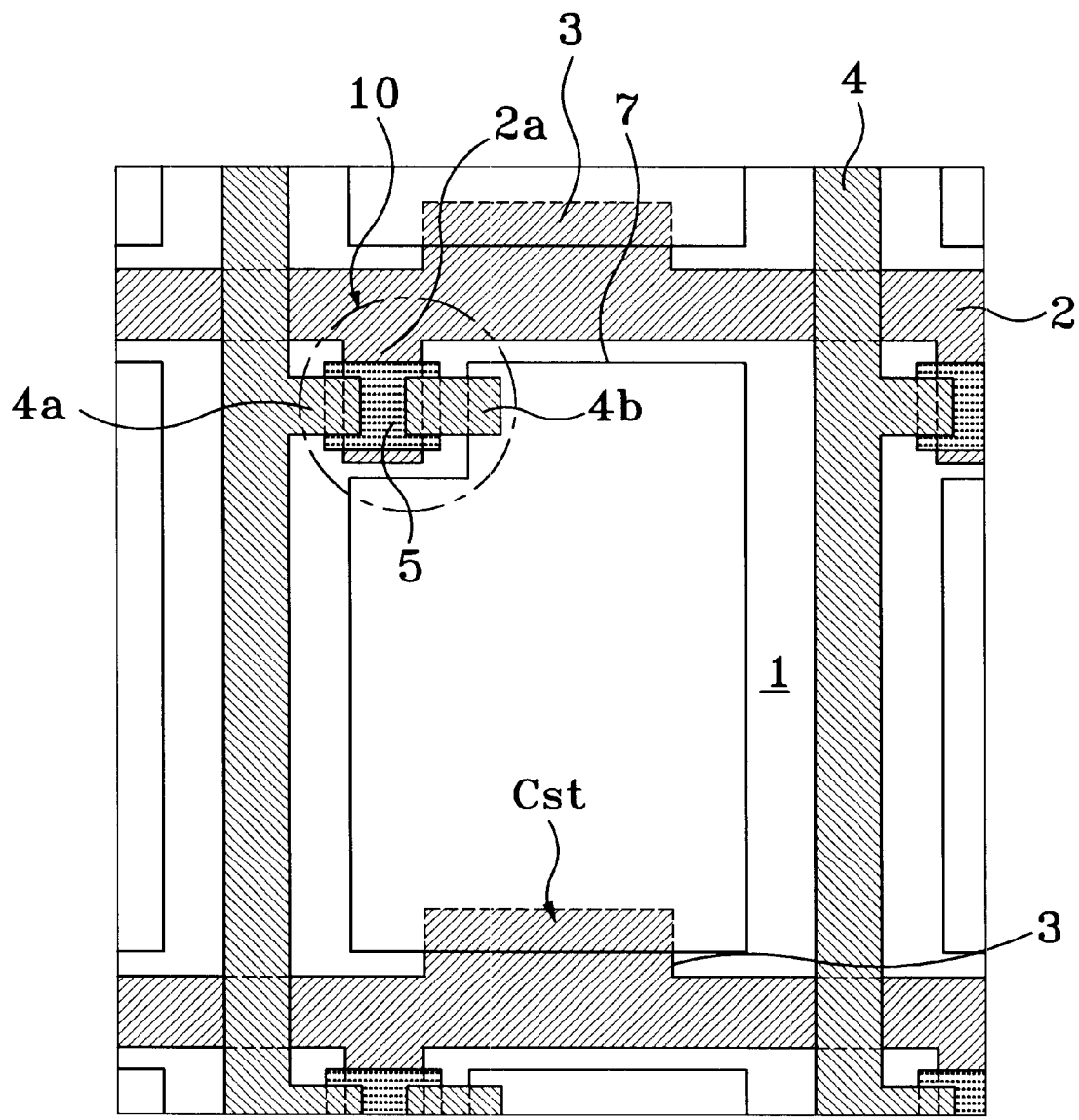
FIG. 1 is a plan view showing an active matrix LCD of a general storage-on-gate type.
Figure 2:
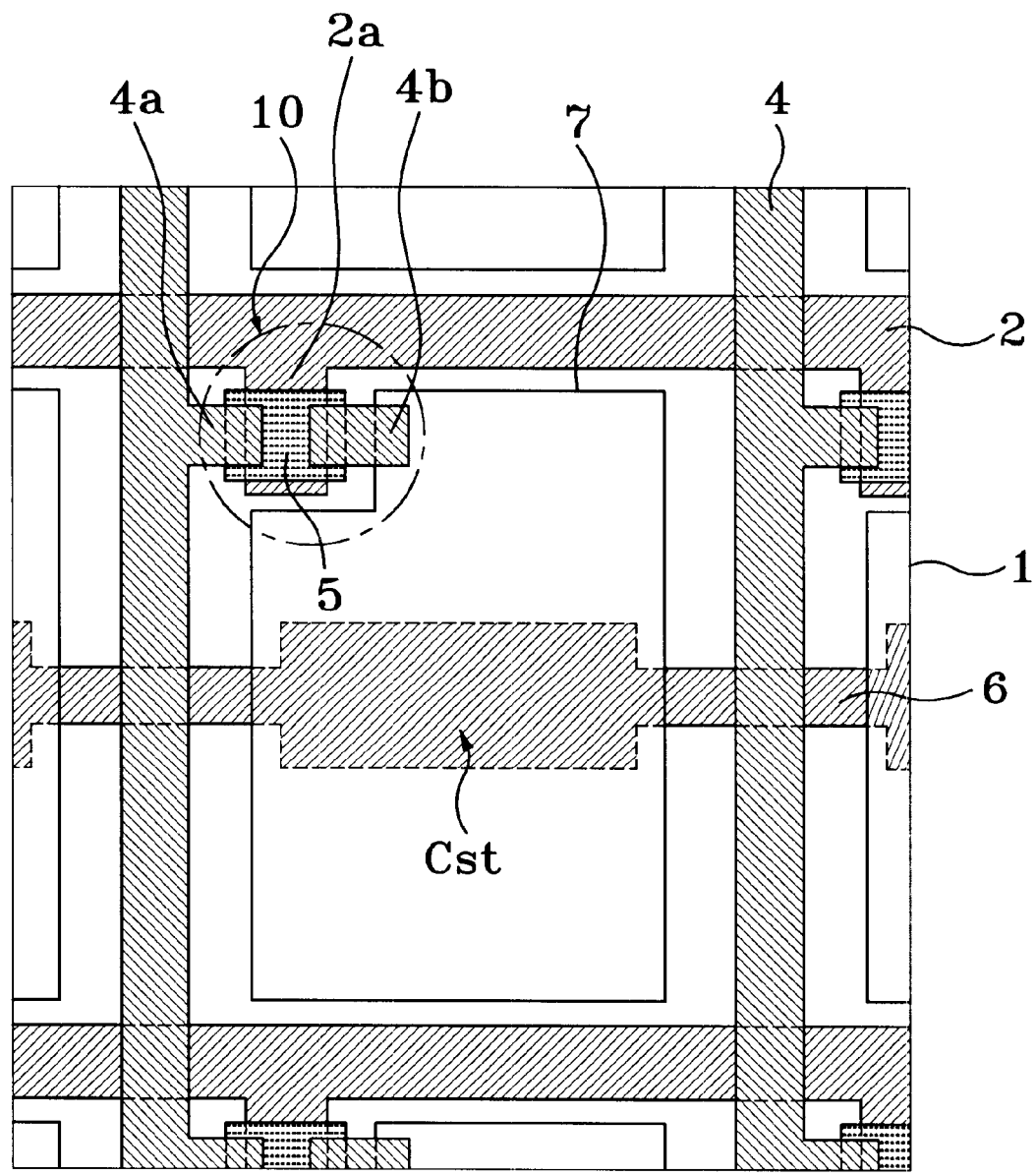
FIG. 2 is a plan view showing an active matrix LCD of a general storage-on-common type.
Figure 3:
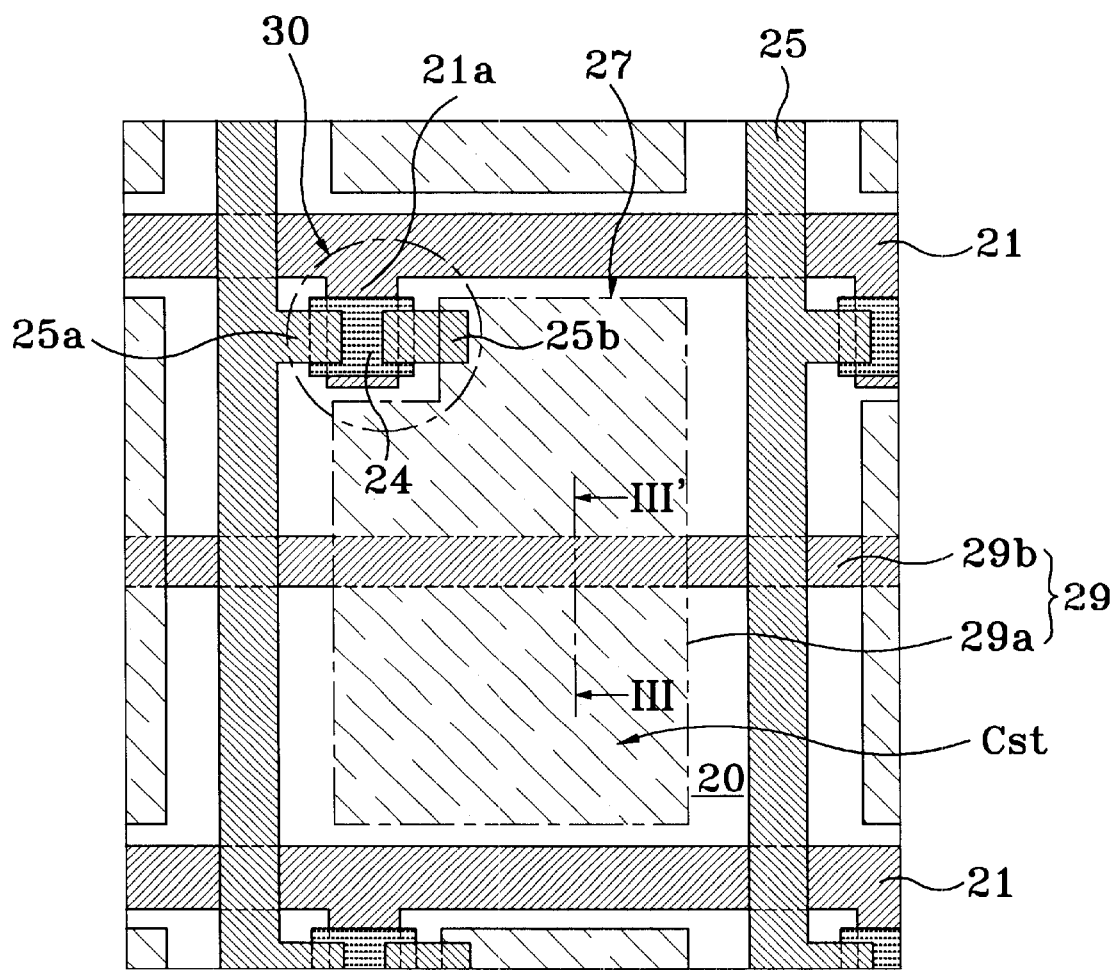
FIG. 3 is a plan view showing a TFT-LCD according to a first embodiment of the present invention.

Referring to FIG. 3, a plurality of gate bus lines 21 are arranged at a lower glass substrate 20 with a regular distance. A plurality of data bus lines 26, are also arranged at the lower glass substrate 20 with a regular distance and disposed to be crossed with the gate bus lines 21 thereby defining pixel region.

A thin film transistor 30 is disposed adjacent to an intersection of the gate bus line 21 and the data bus line 21. The thin film transistor 30 includes a gate electrode 21a being extended from the gate bus line 21 to the pixel; a channel layer 24 disposed on the gate electrode 21a; a source electrode 26a being extended from the data bus line 26 to be contact with one side of the channel layer 24; and a drain electrode, 26b being contacted with the other side of the channel layer 24.

A pixel electrode 27 is disposed at pixel region being surrounded with the gate bus line 21 and the data bus line 25 so that the pixel electrode 27 is contacted with the thin film transistor 30. As known in the art, the pixel electrode 27 is made of a transparent conductor, for example ITO(indium tin oxide) material.

A storage electrode 29a is formed at a bottom of the pixel electrode 27 so that the storage electrode 29a is overlapped with the pixel electrode 27. The storage electrode 29a is shaped similar to the pixel electrode 27 and is made of a transparent conductor, such as ITO. A common electrode line 29b is in contact with the storage electrode 29a and is extended parallel to the gate bus line 21. The common electrode line 29b is made of the same material as the gate bus line 21, i.e. an opaque conductor and is formed between a pair of gate bus lines being disposed adjacent to the common electrode line 29b. Further, the common electrode lint 29b acts for transmitting a common signal to the storage electrode 29a without forming any storage capacitance with the pixel electrode 27, therefore the common electrode line 29b Should have a fine line width which is fine enough not to cause signal delay. Accordingly, within a pixel, the common electrode line 29b of the present embodiment has a finer line width than that of the storage electrode of conventional storage-on-common type. Then, aperture dimension of the LCD device is enlarged.

Moreover, a gate insulating layer(not shown) is formed between the gate bus line 21 and the data bus line 25, and between the storage, electrode 29a and the pixel electrode 27 thereby insulating therebetween respectively.

As described above, the storage electrode 29a is formed to have the same size with the pixel electrode 27 thereby forming storage capacitance Cst in the entire pixel electrode 27. Therefore, the storage capacitance is greatly improved compared to the conventional devices and the picture quality of LCD device is also enhanced.

More concretely, the pixel electrode variation which relates to the picture quality closely, can be shown as following function of capacitance Cst, i.e. the equation 1.

$$\Delta Vp = \frac{Cgs}{Cgs + Cst + Clc} \times \Delta Vg \qquad \text{equation 1}$$

wherein, Δ Vp means the variation of pixel voltage,

Δ Vg means the variation of gate signal,

Csg means the parasitic capacitance between the gate electrode and the source electrode, Cst means a storage capacitance, and Clc means a capacitance of a counter electrode and a pixel electrode.

According to the equation 1, the variation of pixel voltage is mainly affected by not only the storage capacitance Cst but the parasitic capacitance Cgs raised between the gate electrode and the source electrode, and the capacitance Clc between the counter electrode and the pixel electrode. Especially, the parasitic capacitance Cgs of the gate and source electrodes is easily changed during the process of manufacturing if there are caused a lot of changes due to the misalignment of mask, and the capacitance Clc of the counter and pixel electrodes is also easily changed due to the dielectric anisotropy of liquid crystal.

However, if the storage capacitance Cst as in the present embodiment is outstandingly greater than the parasitic capacitance Cgs of the gate and source electrodes and the capacitance Clc of the counter and source electrodes, both affect the variation of pixel voltage, then, the variation of the pixel voltage is not affected so much although the parasitic capacitance Cgs and the capacitance Clc are changed.

Accordingly, an enhanced picture quality is obtainable.

Moreover, since the common electrode line 29b for transmitting the common signal to the storage electrode 29a is formed with fine line width which is the minimum width sufficient to prevent signal delay, the aperture ratio is also improved compared to the conventional one.

Second Embodiment: Method for Manufacturing TFT-LCD

Figure 4:
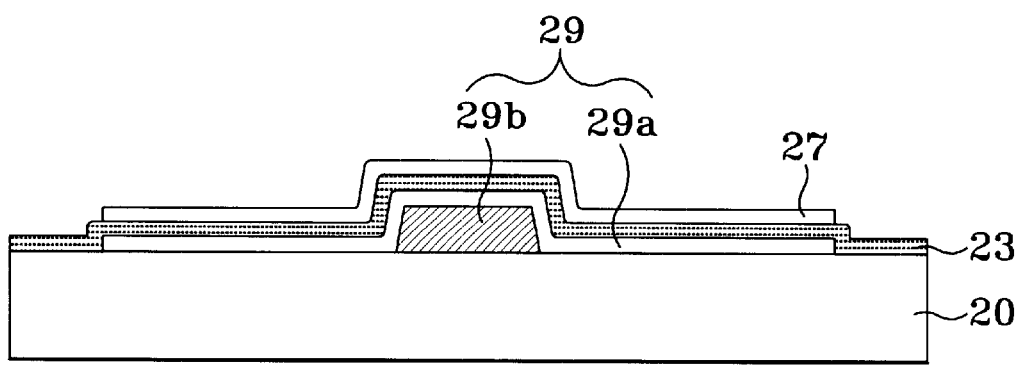
FIG. 4 is a cross-sectional view taken along IV–IV' of FIG. 3 for showing a TFT-LCD according to a second embodiment of the present invention.

Referring to FIG. 4, an opaque metal film is formed on a glass substrate 20. A gate bus line(not shown) and a common electrode line 29b are formed by patterning some portions of the opaque metal film. The common electrode line 29b is formed between the gate bus lines as in the first embodiment. An ITO layer is formed on the glass substrate 20 to be contacted with the common electrode line 29b. Afterward, a storage electrode 29a is formed by patterning a selected portion of the ITO layer. As a result, the storage electrode 29a is contacted with upper and side portions of the common electrode line 29b. A gate insulating layer 23 is formed on the glass substrate 20 in which a storage electrode 29a is formed.

Afterward, although not shown in the drawing, a channel layer(not shown) is formed at a selected portion on the gate bus line and the gate insulating layer 23 is coated on the ITO layer. Next, the ITO layer is formed in the same size with the storage electrode 29a thereby forming a pixel electrode 27.

At this time, the entire region of the pixel electrode 27 is overlapped with the storage electrode 29a, therefore a storage capacitance is formed all over the pixel electrode region.

Although not shown in the drawing, there are followed subsequent steps of forming source and drain electrodes and data bus line.

Third Embodiment: Method for Manufacturing TFT-LCD

Figure 5:
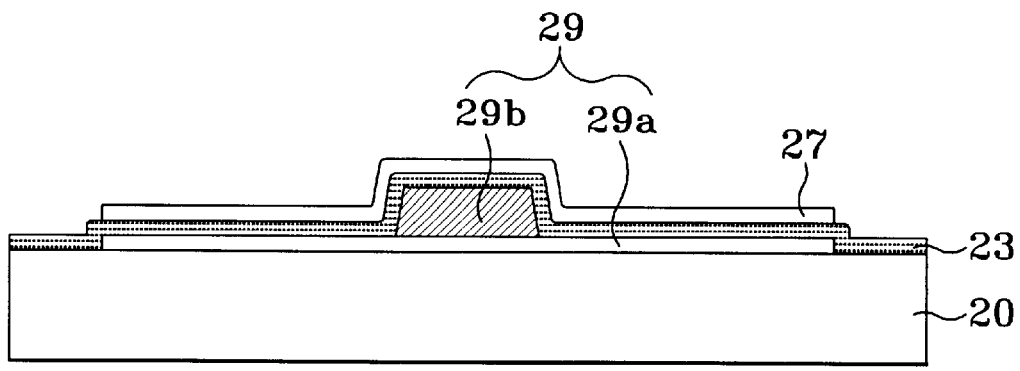
FIG. 5 is a cross-sectional view taken along IV–IV' of FIG. 3 for showing a TFT-LCD according to a third embodiment of the present invention.

Referring to FIG. 5, an ITO layer is formed on a glass substrate 20. A storage electrode 29a is formed by patterning some portions of the ITO layer. An opaque metal film is formed on the glass substrate 20 in which the storage electrode 29a is formed. A gate bus line(not shown) and a common electrode line 29b are formed by patterning a selected portion of the opaque metal film. Herein, the common electrode line 29b is contacted with the storage electrode 29a and the gate bus line(not shown) is not contacted with the storage electrode 29a.

Afterward, although not shown, a channel layer(not shown) is formed at a selected portion on the gate bus line and an insulating layer 23 is coated on the ITO layer. Next, the ITO layer is formed in the same size with the storage electrode 29a thereby forming a pixel electrode 27.

At this time, the entire region of the pixel electrode 27 is overlapped with the storage electrode 29a, therefore a storage capacitance is formed all over the pixel electrode region.

Although not shown in the drawing, there are followed subsequent steps of forming source and drain electrodes and data bus line.

As disclosed in the above specification, according to the present invention, since the storage capacitance is formed in the entire pixel electrode region, the storage capacitance of the TFT-LCD is increased. As a result, the variation of pixel voltage can be reduced and picture quality is also improved.

Further, since the common electrode line for transmitting common signal to the storage electrode has a reduced line width compared to the conventional one, the aperture ratio is also increased compared to the conventional TFT-LCD.

Various other modifications will be apparent to and can be readily made by those skilled in the art without departing from the scope and spirit of the present invention.

What is claimed is:

1. A thin film transistor-liquid crystal display (TFT-LCD) comprising:
   a glass substrate;
   a gate bus lines arranged parallel to each other on the glass substrate;
   data bus lines disposed perpendicular to the gate bus lines, a pair of the gate bus lines and a pair of the data bus lines forming a pixel region;
   a thin film transistor;
   a transparent pixel electrode connected to the thin film transistor and disposed in the pixel region, the pixel electrode having a first side, which is located proximate to one of the pair of the gate bus lines, a second side, which is located proximate to the other one of the pair of the gate bus lines, a third side, which is located proximate to one of the pair of the data bus lines, and a fourth side, which is located proximate to the other one of the pair of the data bus lines, whereby the pixel electrode spans the substantially entire pixel region;
   a transparent storage electrode formed at a bottom of the pixel electrode, wherein the storage electrode spans the entire pixel electrode such that the storage electrode and the pixel electrode form a storage capacitor along the entire pixel electrode and hence the substantially entire pixel region; and
   a common electrode line for transmitting a common signal to the storage electrode.

2. The TFT-LCD of claim 1, wherein the storage electrode has the same size and shape with the pixel electrode.

3. The TFT-LCD of claim 1, wherein the common electrode line is made of the same material with the gate bus line.

4. The TFT-LCD of claim 1, wherein the common electrode line has the minimum line width preventing signal delay.

5. The TFT-LCD of claim 1, wherein the common electrode line is formed between a pair of gate bus lines being disposed adjacent to the common electrode line, and the common electrode line is disposed parallel to the gate bus lines.

6. The TFT-LCD of claim 1, wherein the pixel electrode and the storage electrode are made of ITO(indium tin oxide) layers.

7. The TFT-LCD of claim 1, wherein the common electrode line has a portion which is in contact with the storage electrode and which extends from one side of the pixel region to an opposite side of the pixel region such that it extends completely across the pixel region.

8. A TFT-LCD comprising:
   a glass substrate;
   gate bus lines arranged parallel to each other on the glass substrate;
   data bus lines disposed perpendicular to the gate bus lines, a pair of the gate bus lines and a pair of the data bus lines forming a pixel region;
   a thin film transistor;
   a transparent pixel electrode connected to the thin film transistor and disposed in the pixel region, the pixel electrode having a first side, which is located proximate to one of the pair of the gate bus lines, a second side, which is located proximate to the other one of the pair of the gate bus lines, a third side, which is located proximate to one of the pair of the data bus lines, and a fourth side, which is located proximate to the other one of the pair of the data bus lines, whereby the pixel electrode spans the substantially entire pixel region;
   a transparent storage electrode formed at a bottom of the pixel electrode, wherein the storage electrode spans the entire pixel electrode such that the storage electrode and the pixel electrode form a storage capacitor along the entire pixel electrode and hence the substantially entire pixel region; and
   a common electrode line for transmitting a common signal to the storage electrode,
      wherein the storage electrode has a size and shape identical to those of the pixel electrode,
      wherein the common electrode line has a minimum width for preventing signal delay.

9. The TFT-LCD of claim 8, wherein the pixel electrode and the storage electrode are made of ITO layers.

10. The TFT-LCD of claim 8, wherein the common electrode line is made of the same material with the gate bus line.

11. The TFT-LCD of claim 8, wherein the common electrode line is formed between a pair of gate bus lines being disposed adjacent to the common electrode line, and the common electrode line is disposed parallel to the gate bus lines.

12. The TFT-LCD of claim 8, wherein the common electrode line has a portion which is in contact with the storage electrode and which extends from on side of the pixel region to an opposite side of the pixel region such that it extends completely across the pixel region.

13. A method for manufacturing a TFT-LCD, comprising the steps of:

depositing an opaque metal film on a glass substrate;

forming gate bus lines and common electrode lines by patterning a selected portion of the opaque metal film;

depositing an ITO layer on the glass substrate;

forming a storage electrode in contact with a corresponding one of the common electrode lines by patterning a selected portion of the ITO layer;

forming a gate insulating layer on the glass substrate in which the storage electrode is formed;

forming a pixel electrode on the gate insulating layer; and forming data bus lines, a pair of the gate bus lines and a pair of the data bus lines forming a pixel region such that the pixel electrode is disposed in the pixel region, the pixel electrode having a first side, which is located proximate to one of the pair of the gate bus lines, a second side, which is located proximate to the other one of the pair of the gate bus lines, a third side, which is located proximate to one of the pair of the data bus lines, and a fourth side, which is located proximate to the other one of the pair of the data bus lines, whereby the pixel electrode spans the substantially entire pixel region, and the storage electrode being formed so as to span the entire pixel electrode such that the storage electrode and the pixel electrode form a storage capacitor along the entire pixel electrode and hence the substantially entire pixel region.

14. The method of claim 13, wherein the corresponding one of the common electrode lines has a portion which is in contact with the storage electrode and which extends from one side of the pixel region to an opposite side of the pixel region such that it extends completely across the pixel region.

15. A method for manufacturing a TFT-LCD, comprising the steps of:

depositing an ITO layer on a glass substrate;

forming a storage electrode by patterning a selected portion of the ITO layer;

depositing an opaque metal film on the glass substrate in which the ITO layer is formed;

forming gate bus lines and common electrode lines by patterning a selected portion of the opaque metal film, wherein the storage electrode is in contact with a corresponding one of the common electrode lines;

forming a gate insulating layer on a resultant of the glass substrate;

forming a pixel electrode on the gate insulating layer; and forming data bus lines, a pair of the gate bus lines and a pair of the data bus lines forming a pixel region such that the pixel electrode is disposed in the pixel region, the pixel electrode having a first side, which is located proximate to one of the pair of the gate bus lines, a second side, which is located proximate to the other one of the pair of the gate bus lines, a third side, which is located proximate to one of the pair of the data bus lines, and a fourth side, which is located proximate to the other one of the air of the data bus lines, whereby the pixel electrode spans the substantially entire pixel region, and the storage electrode being formed so as to span the entire pixel electrode such that the storage electrode and the pixel electrode form a storage capacitor along the entire pixel electrode and hence the substantially entire pixel region.

16. The method of claim 15, wherein the corresponding one of the common electrode lines has a portion which is in contact with the storage electrode and which extends from one side of the pixel region to an opposite side of the pixel region such that it extends completely across the pixel region.

* * * * *